Feb. 19, 1957 J. F. SHIRK 2,782,084
PISTON RING ASSEMBLY AND PISTON RING EXPANDER
Filed March 3, 1955
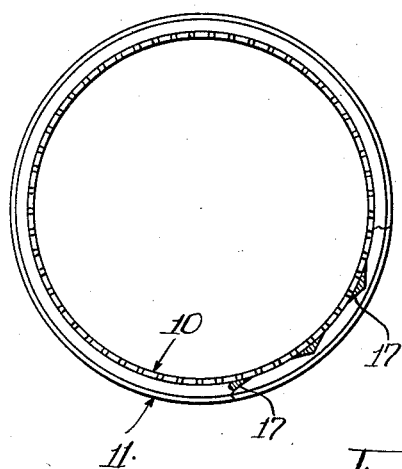
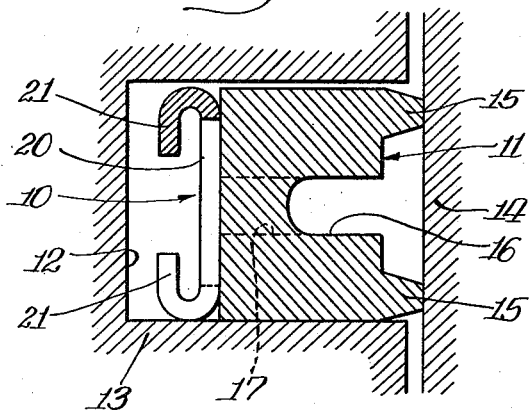
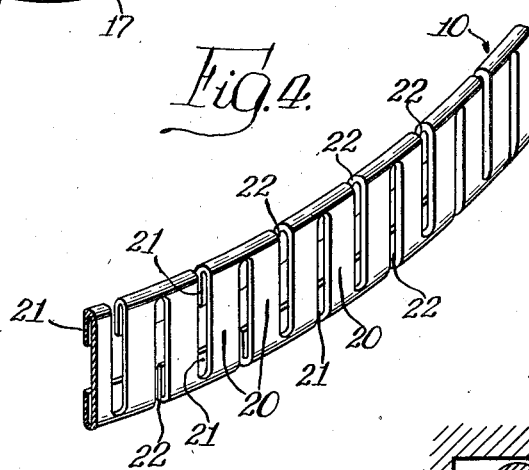
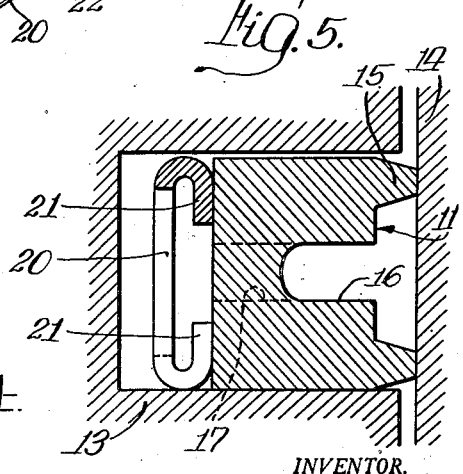
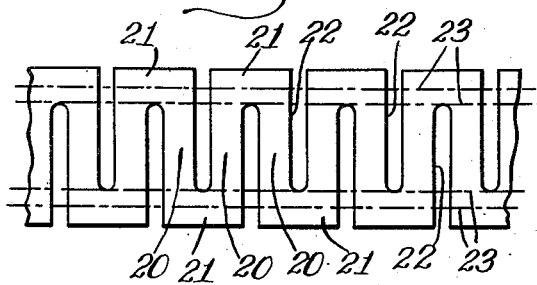
INVENTOR.
John F. Shirk,
BY
Davis, Lindsey, Hibben & Noyes
Atty's United States Patent Office 2,782,084
Patented Feb. 19, 1957

2,782,084

PISTON RING ASSEMBLY AND PISTON RING EXPANDER

John F. Shirk, Hagerstown, Ind., assignor to Perfect Circle Corporation, Hagerstown, Ind., a corporation of Indiana Application March 3, 1955, Serial No. 491,905

12 Claims. (Cl. 309—43)

The invention relates to piston ring assemblies and piston ring expanders therefor, and the general object of the invention is to provide a piston ring assembly having a novel expander which is self-expanding and does not abut the bottom of the piston ring groove to exert an outward force on the associated ring member, which exerts a uniform outward force on the ring member throughout the circumference of the latter, and which requires no special formation of the ring member to accommodate the expander.

Another object is to provide a novel piston ring expander of the circumferentially expansible type, with the ends of the expander in abutment with each other, the expander being of such cross-sectional shape that the end surfaces insure proper abutment and no latch or other means is needed to hold the ends against misplacement relative to each other.

A further object is to provide a novel piston ring expander of such construction that it will not buckle at the point where it bridges the gap in the associated ring member when the latter is fully expanded before insertion into the cylinder, so that the expander will not interfere with proper contraction of the ring member for insertion into the cylinder.

Still another object is to provide a novel piston ring expander which bears smoothly against its associated ring member and does not wear into the ring member in such a manner that proper expansion is prevented.

Other objects and advantages will become apparent from the following description taken in connection with the accompanying drawing, in which:

Fig. 1 is a plan view of a piston ring assembly embodying the features of the invention;

Fig. 2 is an enlarged radial sectional view of the piston ring assembly shown in Fig. 1 and illustrating the assembly mounted in a groove in a piston and in engagement with the cylinder wall;

Fig. 3 is a fragmentary elevational view of a strip of material from which the expander of the ring assembly is made;

Fig. 4 is a fragmentary perspective view of the expander; and

Fig. 5 is a view similar to Fig. 2 but showing a ring assembly having a modified form of expander.

The invention relates to a piston ring assembly, and particularly to an expander for use in such assembly. The expander is constructed of sheet metal and is circumferentially expansible so that it does not need to abut the bottom of the groove to exert an outward force on the associated ring member. The expander comprises generally a plurality of axially extending circumferentially spaced web members, the respective ends of which are connected by two rows of segments, and the segments are reversely bent relative to the web members with the segments in one row axially spaced from the segments in the other row. With this construction, a flat surface formed by the web members, in the case of the form of Fig. 2, is adapted to bear against the associated ring member, while in the form of Fig. 5 a pair of flat surfaces formed by the segments bear against the associated ring member.

In the form of the invention shown in Figs. 1 to 4, inclusive, the preferred embodiment of the ring assembly comprises an expander, indicated generally at 10, and a ring member indicated generally at 11. The ring assembly is adapted to be mounted in a groove 12 in a piston 13, and the ring member 11 is adapted to engage the wall of a cylinder 14.

While the expander 10 requires no special form of ring member, the ring member illustrated comprises a cast iron ring provided with a gap and having a pair of axially spaced flanges 15 formed on its outer peripheral surface for engaging the cylindrical wall 14. The ring member 11 is generally rectangular in cross-section and has a groove 16 cut in its outer periphery and extending radially inward. To permit the flow of oil scraped from the cylinder wall 14 by the flanges 15, a plurality of slots 17 extend inwardly through the ring member from the groove 16. The slots 17 are axially spaced from both sides of the ring member 11.

The expander 10 is adapted to bear against the inner peripheral surface of the ring member 11 and comprises a plurality of axially extending circumferentially spaced web members 20. The latter are connected at their respective ends by segments 21 which are reversely bent relative to the web members 20. The expander is formed from a strip of sheet metal, shown in Fig. 3, which is provided with a plurality of transversely extending slots 22 extending inwardly and alternately from opposite edges of the strip to form the segments 21, the slots in one edge overlapping the slots in the other edge to form the web members 20. The segments 21 are then bent reversely relative to the web members 20 to extend toward each other. Preferably such bending is made along two longitudinally extending lines 23, first radially and then axially, for each row of segments so that the reversely bent portions of the segments are radially spaced from the web members 20. The segments are so dimensioned that those in one row are axially spaced from those in the other row and are axially aligned with those in the other row, when reversely bent in the manner described above. By bending the segments along the two lines 23, they form a U shape with the upper and lower edges of the expander curved, as illustrated in Figs. 2 and 4. The central portion of the strip comprising the web members 20 thus forms one periphery of the expander while the edge portions of the strip comprising the segments 21 form the other periphery.

By virtue of the web member and segment construction of the expander, it is circumferentially expansible and when formed into a ring with its ends in abutment, it will tend to increase its circumferential dimension because of compression of the web members toward each other when confined in the cylinder. The expander will thus exert an outward force on the ring member 11 to hold the latter with the desired pressure against the cylinder wall 14. The reversely bent segments and the web members at the ends of the expander provide a substantial area for abutment of the ends, and no clip, latch or other device is needed to hold the ends against displacement relative to each other. The circumferential spacing of the web members by the slots 22 permits oil to flow inwardly through the slots 17 in the ring member 11. The segments 21 prevent the expander from buckling outwardly so that, as the ring assembly is being inserted in the cylinder, the expander will not crowd into the gap between the ends of the ring member 11 and prevent proper contraction of the latter in the cylinder. In the form of the invention shown in Fig. 2, the segments 21 are bent inwardly from the web members 20 so that the web members form the outer periphery and provide a flat surface bearing smoothly against the ring member 11. Thus the expander will not wear into the ring member in a manner that would prevent proper expansion thereof.

In the form of the invention shown in Fig. 5, the ring member 11 is of the same construction as shown in Fig. 2. The expander in this instance, while substantially similar to that shown in Fig. 2, differs therefrom only in that the segments 21 are bent outwardly and thence axially relative to the web members 20. With this construction, two flat surfaces provided by the respective rows of segments bear against the ring member 11 adjacent the sides thereof, and the axial spacing of one row of segments from the other row is at least equal to the axial width of the slots 17 in the ring member. In the form illustrated, the two rows of segments are axially spaced a distance greater than the axial width of slots 17. The segments 21 are thus clear of the inner openings of the slots 17 so that oil may flow freely therethrough. The expander of Fig. 5 of course has all the advantages described in connection with the form of Fig. 2.

I claim:

1. A piston ring expander comprising a strip of sheet metal alternately slotted from opposite edges of the strip and having portions at the respective edges of the strip reversely bent to extend axially toward each other with the edges spaced from each other.

2. A piston ring expander comprising a plurality of circumferentially spaced axially extending web members, and two rows of segments connecting the respective ends of the web members, said segments being reversely bent relative to the web members with each row extending toward, but axially spaced from, the other row.

3. A piston ring expander comprising a plurality of circumferentially spaced axially extending web members, and two rows of segments connecting the respective ends of the web members, said rows being bent to provide axially extending portions radially spaced from the web members.

4. A piston ring expander comprising a strip of sheet metal alternately slotted from opposite edges of the strip, the central portion forming one periphery of the expander, and the edge portions being reversely bent relative to the central portion and being radially spaced therefrom and forming the other periphery of the expander.

5. A piston ring expander comprising a strip of sheet metal having its longitudinal edge portions bent reversely relative to its central portion to extend axially toward each other, said strip having transverse slots extending axially and alternately from the upper and lower sides, each slot extending through one reversely bent edge portion and through the central portion and terminating at the other reversely bent edge portion.

6. A piston ring expander comprising two axially aligned rows of axially extending segments having their adjacent edges axially spaced from each other, the outer edges of the segments being bent radially and connected by axially extending web members.

7. A piston ring expander comprising a strip of sheet metal having its longitudinal edge portions bent reversely relative to its central portion to extend axially, the bent strip having transverse overlapping slots to render it circumferentially expansible.

8. A piston ring expander comprising two axially spaced rows of segments, each segment comprising a curved edge portion at one side of the expander and an opposite edge portion axially spaced from the corresponding portion of a segment in the opposite row, and axially extending web members connecting the curved edge portions of the two rows of segments.

9. A piston ring expander comprising a plurality of flat axially extending web members forming the outer periphery of the expander and adapted to bear outwardly against ring means and two rows of axially and oppositely extending segments reversely bent relative to the web members and forming the inner periphery of the ring.

10. A piston ring expander comprising a plurality of flat axially extending web members, the upper and lower ends of the web members being respectively connected to two rows of segments which are bent radially and then axially in parallel relation to the web members.

11. A piston ring expander comprising a plurality of axially extending web members circumferentially spaced from each other, the upper and lower ends of the web members being respectively connected by two rows of segments which are bent radially outward from the ends of the web member and then axially toward each other to form bearing surfaces adapted to engage the inner periphery of ring means adjacent the sides thereof.

12. A piston ring assembly comprising a ring member having a plurality of slots extending radially therethrough with the slots axially spaced from both sides of the ring member, and an expander comprising a plurality of axially extending circumferentially spaced web members, and two rows of segments respectively connecting the ends of the web members, said segments being reversely bent relative to the web members and being located radially outside of said web members and bearing outwardly against said ring member, the segments in one row being axially spaced from the segments in the other row a distance at least equal to the axial width of the slots in the ring member to permit free flow of oil therethrough.

References Cited in the file of this patent

UNITED STATES PATENTS

| 345,767 | Buckley | July 20, 1886 |
| 2,293,450 | Wilkening | Aug. 18, 1942 |

FOREIGN PATENTS

| 6,062 | Great Britain | Apr. 24, 1888 |